(12) United States Patent
Hulsken

(10) Patent No.: US 9,578,227 B2
(45) Date of Patent: Feb. 21, 2017

(54) DETERMINING A POLAR ERROR SIGNAL OF A FOCUS POSITION OF AN AUTOFOCUS IMAGING SYSTEM

(75) Inventor: Bas Hulsken, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 769 days.

(21) Appl. No.: 13/805,555

(22) PCT Filed: Jun. 17, 2011

(86) PCT No.: PCT/IB2011/052641
§ 371 (c)(1),
(2), (4) Date: Dec. 19, 2012

(87) PCT Pub. No.: WO2011/161594
PCT Pub. Date: Dec. 29, 2011

(65) Prior Publication Data
US 2013/0093874 A1    Apr. 18, 2013

(30) Foreign Application Priority Data

Jun. 24, 2010  (EP) ..................................... 10305676

(51) Int. Cl.
  *G02B 7/04*     (2006.01)
  *G06M 7/00*    (2006.01)
  *H01L 27/00*   (2006.01)
  *H04N 5/232*   (2006.01)
  *G02B 21/24*   (2006.01)
  *G02B 21/36*   (2006.01)
(52) U.S. Cl.
  CPC ........ *H04N 5/23212* (2013.01); *G02B 21/241* (2013.01); *G02B 21/244* (2013.01); *G02B 21/245* (2013.01); *G02B 21/367* (2013.01)
(58) Field of Classification Search
  CPC ............ G02B 21/0032; G02B 27/0075; G01B 9/02043
  USPC .......... 250/201.1–201.9, 221, 216; 359/319, 359/382, 383, 425, 426, 625, 626, 684, 359/694–706, 822–826; 348/208.12, 345–357; 396/79–82, 89, 102–104, 121–124
  See application file for complete search history.

(56) References Cited

U.S. PATENT DOCUMENTS

| | | | |
|---|---|---|---|
| 4,314,150 A | 2/1982 | Takayama | |
| 6,711,283 B1 | 3/2004 | Soenksen | |
| 6,917,696 B2 | 7/2005 | Soenksen | |
| 7,232,980 B2 | 6/2007 | Oshiro et al. | |
| 7,700,903 B2 | 4/2010 | Weiss et al. | |
| 7,772,535 B2 * | 8/2010 | Krief et al. | 250/208.1 |
| 7,813,579 B2 | 10/2010 | Oshiro et al. | |
| 2005/0258335 A1 | 11/2005 | Oshiro | |
| 2005/0270611 A1 * | 12/2005 | Oshiro et al. | 359/205 |

(Continued)

FOREIGN PATENT DOCUMENTS

| | | |
|---|---|---|
| EP | 0834758 A2 | 4/1998 |
| JP | H1172311 A | 3/1999 |

(Continued)

*Primary Examiner* — Pascal M Bui-Pho

(57) ABSTRACT

An autofocus imaging system for a microscope system includes a tilted autofocus image sensor that images an oblique cross-section of a slide. The autofocus imaging system focuses multiple sequential overlapping images, which have been taken by the tilted autofocus image sensor, by making a comparison of the multiple sequential overlapping images. An axial position of a tissue layer on the slide can be determined from a polar error signal resulting from this comparison.

11 Claims, 7 Drawing Sheets

(56) References Cited

U.S. PATENT DOCUMENTS

| | | |
|---|---|---|
| 2009/0295963 A1 | 12/2009 | Bamford et al. |
| 2012/0287256 A1 | 11/2012 | Hulsken et al. |
| 2013/0093874 A1 | 4/2013 | Hulsken |

FOREIGN PATENT DOCUMENTS

| | | |
|---|---|---|
| JP | 2002365524 A | 12/2002 |
| JP | 03900609 B2 | 4/2007 |
| WO | 0184209 A2 | 11/2001 |
| WO | 2005010495 A2 | 2/2005 |
| WO | 2011080670 A1 | 7/2011 |

* cited by examiner

DETERMINING A POLAR ERROR SIGNAL OF A FOCUS POSITION OF AN AUTOFOCUS IMAGING SYSTEM

FIELD OF THE INVENTION

The present invention relates to the field of digital pathology and other fields of rapid microscanning In particular, the present invention relates to an autofocus imaging system for a microscope, a microscope comprising an autofocus imaging system, a method for autofocus imaging of a microscope, a computer-readable medium and a program element.

BACKGROUND OF THE INVENTION

In digital pathology and particular in the case of whole slide scanning, specimens are sliced and imaged for analysis purposes as well as teaching purposes. Line sensors may be used for scanning a whole tissue slide. These slide scanners may perform a continuous mechanical scanning, thereby reducing stitching problems and allowing for the use of so-called time delay integration (TDI) line sensors in order to accommodate for low brightness of the illumination, as for example disclosed in WO 01/84209 A2.

Before the actual scanning the optimum focus position may be determined at a number of positions on the slide. This results in a "focus map". This procedure can be used when the axial position of the tissue layer may vary with several micrometers across the slide, as depicted in FIG. 1 (to avoid any doubt, it should noted here that the term axial refers herein to a direction along the axis 7 shown in FIG. 2).

The variation of the tissue layer may thus be more than the focal depth of the microscope objective. During scanning the focus position of the objection is set on a trajectory that interpolates between the measured optimum focus settings on the selected measurement locations. However, this procedure may be both prone to errors and be also time-consuming, thereby limiting the throughput of the system.

In known autofocus imaging systems it may not be possible to determine the sign of the focus error (above or below focus), i.e. the focus error signal may not be polar. This may be disadvantageous for a continuous autofocus system that needs permanent updates on the optimum focus setting.

WO 2005/010495 A2 describes a system and a method for generating digital images of a microscope slide, the microscope comprising a main camera and a focus camera which is tilted with respect to the optical axis.

SUMMARY OF THE INVENTION

It may be desirable to have an improved auto focus function of a scanning microscope.

According to a first aspect of the invention an autofocus imaging system for a microscope system is provided, which comprises an image sensor arrangement for acquiring primary image data of an object of interest and first and second autofocus image data of an oblique section of the object of interest, wherein the image sensor arrangement comprises a tilted image sensor which is adapted for acquiring the first autofocus image data and, at a later time, the second autofocus image data. The system further comprises a calculation unit for generating a polar error signal of a focus position of the microscope system on the basis of a comparison of first data relating to the first autofocus image data with second data relating to the second autofocus image data.

According to an exemplary embodiment, the image sensor arrangement comprises a primary image sensor for acquiring the primary image data of the object of interest and a tilted autofocus image sensor for acquiring the first autofocus image data and, at a later time, the second autofocus image data of an oblique section of the object of interest.

In other words, the autofocus imaging system comprises a primary image sensor and an autofocus image sensor which is (or which both are) not arranged perpendicular to the optical axis of the lens which focuses the radiation which travels from the object of interest towards the autofocus image sensor on the autofocus image sensor (in the following also referred to as "optical axis of the radiation" or "optical axis of the primary image sensor") but which is tilted with respect to that optical axis. This tilted autofocus image sensor acquires a sequence of autofocus image data, each autofocus image data acquired at another time and therefore for another position of the object of interest (which moves during imaging).

Another embodiment is the actual combination of the functions of the primary image sensor and the autofocus image sensor into one physical sensor, which is tilted with respect to the above described optical axis. This sensor would have to be a 2D image sensor of some fashion, where all or a subset of the pixels are used to generate the autofocus image data, while another potentially overlapping set is used to generate the primary image data. These two sets of pixels can be different physical pixels captured simultaneously, or partially the same pixels captured sequentially. Or a combination of both. For more details about how such a sensor combining the imaging and autofocusing functions can be implemented and used, the reader may refer to the European patent application No 09306350, which is hereby incorporated by reference.

Then a comparison of first data relating to the first autofocus image data and second data relating to the second autofocus image data is performed. This first and second data may be the originally acquired first and second autofocus image data or a transformation of this image data or a metric derived from the first and second autofocus image data, respectively.

According to an exemplary embodiment the comparison comprises the determination, in the first data, of a first contrast function and the determination, in the second data, of a second contrast function. Both the first and second contrast functions are functions of an x-position on the autofocus image sensor. After that, the first contrast function is compared with the second contrast function.

According to another exemplary embodiment the calculation unit is adapted for correcting the second contrast function for translation of the object of interest and for subtracting the two contrast functions (or filtered or transformed versions of the two contrast functions) from each other, thus resulting in an S-curve.

In other words, according to this embodiment comparing of the first contrast function with the second contrast function comprises a subtraction of first data relating to the first contrast function from second data which relates to the second contrast function, wherein either the first or the second contrast function has been corrected for translation before the subtraction is performed.

According to another exemplary embodiment the calculation unit determines a zero crossing of the S-curve for generating the polar error signal.

Since the S-curve comprises less high frequency detail than the first and second autofocus image data, determination of the zero crossing of the S-curve may be performed with high accuracy thus enabling to determine the polar error signal with high accuracy.

According to another exemplary embodiment the autofocus imaging system is adapted for performing a feedback or feed forward control of the focus position for the determination of an optimal focus position.

According to a second aspect of the invention a microscope comprising an above and below described autofocus imaging system is provided.

According to an exemplary embodiment of the invention, the microscope is adapted as a slide scanner for digital pathology.

According to another aspect of the invention a method for autofocus imaging of a microscope system is provided, in which primary image data of an object of interest are acquired by a primary image sensor arrangement. Furthermore, first autofocus image data and, at a later time, second autofocus image data of an oblique section of the object of interest is acquired by a tilted autofocus image sensor of the image sensor arrangement. Then a polar error signal of a focus position of the microscope system is generated on the basis of a comparison of first data relating to the first autofocus image data with second data relating to the second autofocus image data.

According to another aspect of the invention a computer-readable medium is provided, in which a computer program for autofocus imaging of a microscope system is stored which, when executed by a processor of a microscope system, causes the processor to carry out the above and/or below described method steps.

Furthermore, according to another aspect of the invention, a program element for autofocus imaging of a microscope system is provided, which, when being executed by a processor of a microscope system, causes the processor to carry out the above and/or below described method steps.

A computer-readable medium may be a floppy disk, a harddisk, a CD, a DVD, a USB (Universal Serial Bus) storage device, a RAM (Random Access Memory), a ROM (Read Only Memory) and an EPROM (Erasable Programmable Read Only Memory). A computer-readable medium may also be a data communication network, for example the internet, which allows downloading a program code.

It may be seen as a gist of an exemplary embodiment of invention that a system for continuous autofocus for rapid slide scanning is provided which is based on an additional image sensor that is tilted with respect to the optical axis. This autofocus image sensor images an oblique cross-section of the slide. For focussing a comparison of multiple sequential overlapping images taken by the oblique autofocus image sensor is performed. The axial position of the tissue layer may be determined from the polar error signal resulting from this differential measurement.

DETAILED DESCRIPTION OF EMBODIMENTS

Figure 1:
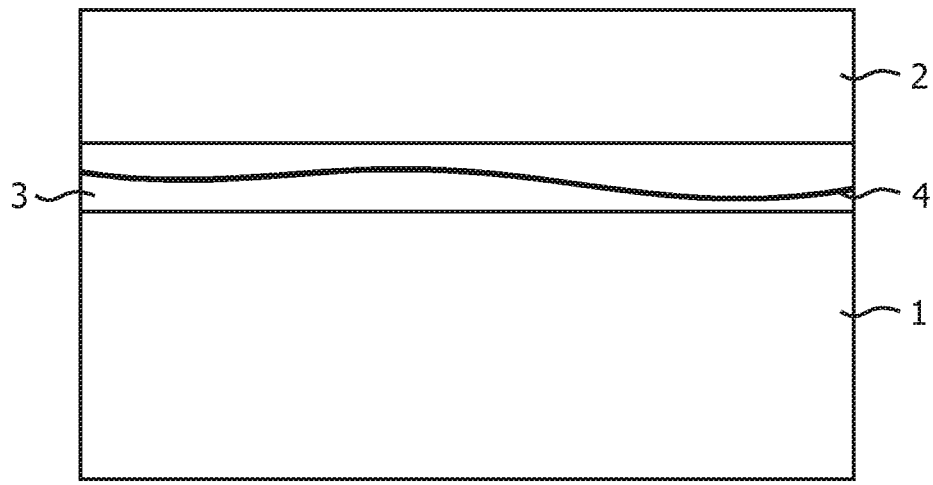
FIG. 1 shows a cross-section of a tissue slide assembly.

The illustration in the drawings is schematically. In different drawings, similar or identical elements are provided with the same reference numerals. In the following, the character prime (') associated to a symbol will mean that the image space is considered (e.g.

sensor reference) while a symbol without prime character will mean that the object space is considered (typically the sample reference). For example, when the angle Beta prime (β') will be used in this description, a rotation in image space, and, as will be described more specifically, a rotation of the physical sensor, will be indicated. Also, an angle Beta (β without prima) will indicate a rotation in object space, and as will be described more specifically a rotation of an oblique cross section of the sample that is imaged by the autofocus sensor.

FIG. 1 shows a schematic cross-section of a tissue slide assembly, comprising a microscope slide 1, having a typical thickness of 1 mm, a cover slip 2, with a typical thickness of 0.17 mm, a mounting medium 3 for fixing and sealing off a tissue layer 4. The tissue layer is typically around 5 μμm thick, the mounting layer includes the tissue layer and is typically 10-15 μm thick. The mounting medium may be applied to the slide with tissue layer in liquid form before a cover slip is attached to the slide, subsequently the mounting liquid solidifies, thus mechanically fixing the tissue layer and sealing it off from the outside environment in order to provide stability against deterioration. The axial position of the tissue layer may vary within several μm across the slide.

For providing an optimum resolution during scanning the focus may have to be adjusted continuously, since the axial position of the tissue layer varies.

An alternative for the use of the "focus map"-method is the use of a continuous autofocus system, i.e. an additional system that continuously measures the optimum focus position and adapts the axial position of the objective lens during the actual scan for acquiring the digital image. The autofocus system may be based on optimizing the contrast in the obtained image. A variety of metrics may be used for contrast optimization. However, the sign of the focus error (above or below focus) cannot be determined in this manner, i.e. the focus error signal is not polar. This may be disadvantageous for a continuous autofocus system that needs permanent updates on the optimum focus setting.

The autofocus system may use the line reflected at a reference surface at or near the object plane, such as in optical discs. However, a drawback of this method when applied to tissue slides may be that the relevant interface (between the microscope slide and the tissue layer and between the tissue layer and the cover slip) may have a low reflectance and that the reflection signal is distorted by scattering arising from the nearby tissue layer, thus compromising robustness.

Figure 2:
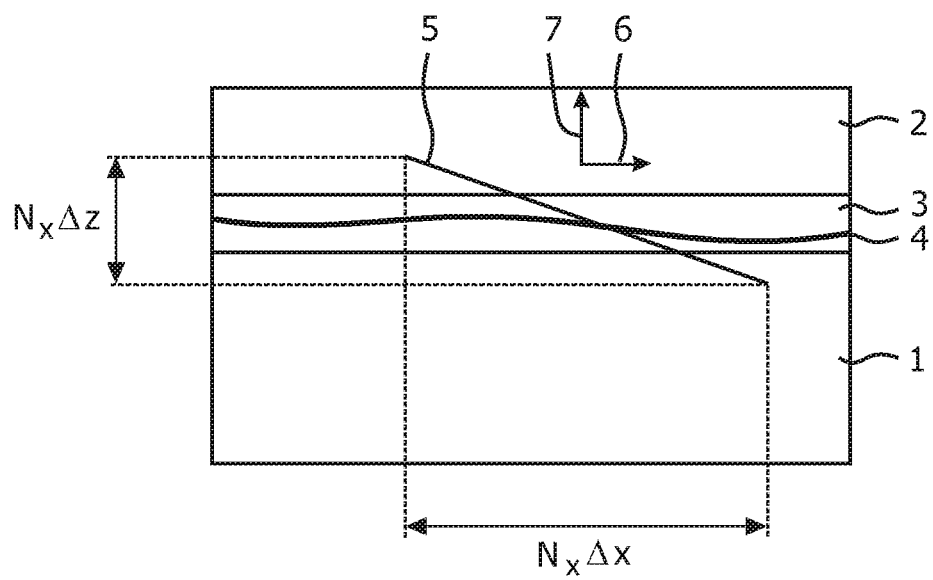
FIG. 2 shows an oblique cross-section of the tissue slide assembly.

A good alternative is the use of an additional sensor that is tilted with respect to the optical axis. This autofocus image sensor makes an image of an oblique section of the object, as depicted in FIG. 2. This section may cut through the tissue layer at some point depending on the axial position of the tissue layer or relative to the focal plane of the objective lens. In this way the position of the tissue layer on the sensor is a measure for the amount of defocus. For more details the reader may refer to European patent application 09306350, which is hereby incorporated by reference.

As can be seen from FIG. 2 the tilted autofocus image sensor makes an image of an oblique cross-section 5 of the tissue slide assembly. The tilt is in the scanning direction 6 (i.e. direction x). The sensor has $N_x$ pixels and samples the object in the scan direction with $\Delta x$ per pixel and in the axial direction 7 with $\Delta z$ per pixel.

For example, the autofocus imaging system operates using wavelengths outside the visible spectrum so as not to spoil the visible light imaging of the tissue layer. For example, the autofocus system operates using wavelengths on the infrared side of the visible spectrum, because ultraviolet radiation may damage the tissue and may require more complicated and/or expensive optical components than infrared radiation.

The additional autofocus image may be provided in a variety of ways. One possibility is to use so-called dark field illumination. Hereby, the sample is illuminated with a beam comprising a set of directions of propagation.

The depth range $\Delta z_{tot}$ of the autofocus system must be sufficiently large for an appropriate setting of other parameters. The autofocus image sensor has $N_x$ pixels in the scan direction, with pixel size b. The sensor is tilted over an angle $\beta'$ so that the lateral and axial sampling is given by:

$$\Delta x' = b \cos \beta'$$

$$\Delta z' = b \sin \beta'$$

The lateral and axial sampling at the object (the tissue slide) is given by:

$$\Delta x = \Delta x'/M$$

$$\Delta z = n\Delta z'/M^2$$

where M is the magnification and n the refractive index of the object. The axial sampling at the object now follows as:

$$\Delta z = \frac{n\Delta z'}{(\Delta x'/\Delta x)^2} = \frac{\sin \beta'}{\cos^2 \beta'} \frac{n\Delta x^2}{b}$$

As there are $N_x$ pixels the total depth range is:

$$\Delta z_{tot} = N_x \Delta z = \frac{\sin \beta'}{\cos^2 \beta'} \frac{N_x n\Delta x^2}{b}$$

The lateral sampling at the object $\Delta x$ should be sufficiently small in order to enable the generation of defocus-sensitive high-frequency information. The largest defocus sensitivity is found at half the cut-off spatial frequency, so $\Delta x$ is preferably in the range 0.5 to 1.0 μm, say around $\Delta x$=0.75 μm. Taking a VGA-sensor ($N_x$=640 by $N_y$=480 pixels) with pixel size b=10 μm, and using a refractive index n=1.5 the relation between depth range and sensor tilt angle is as shown in FIG. 3 (see curve 303).

Figure 3:
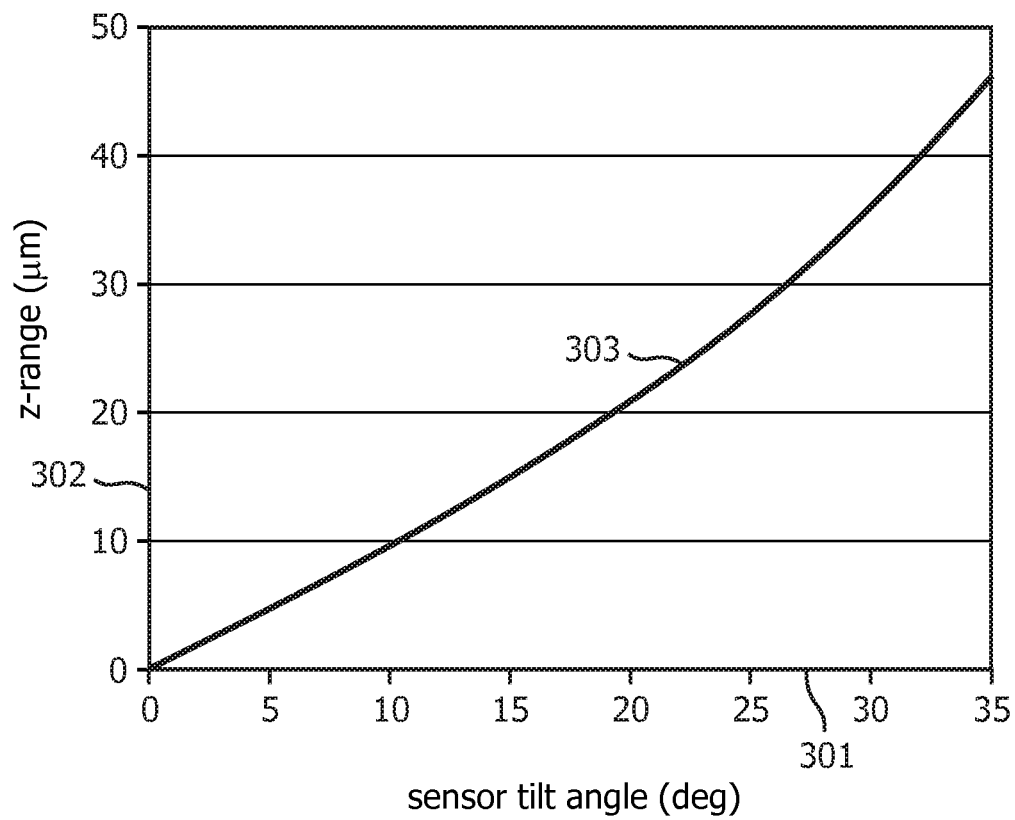
FIG. 3 shows a relation between depth range and tilt angle of the autofocus image sensor.

In FIG. 3, the horizontal axis 301 depicts the autofocus sensor tilt angle between 0 degrees and 35 degrees and the vertical axis 302 depicts the z-range between 0 micrometers and 50 micrometers.

Roughly the depth range increases with 1 μm per degree tilt. The depth range may be preferably around 20 μm, so a moderate tilt angle of around 20 deg would be sufficient. In that case the axial sampling $\Delta z$ is around 42 nm, which is sufficiently small to enable finding the axial position of the tissue layer with sub-μm accuracy.

It appears that not all $N_y$ rows of pixels are needed for a defocus error signal with sufficient signal-to-noise ratio. In principle $N_y$=1 may be sufficient. However, using multiple rows improves the robustness of the signal. If the sensor is a CMOS-sensor windowing (only read out a restricted number of rows) may be used, which may have positive effects on the computational burden and/or the frequency of measurements of the autofocus signal. Furthermore, the lateral location of the window may be adapted from scan to scan, so as to adapt to the average lateral position of the tissue. For example, if the scan area encompasses the edge of the tissue area, one side of the line sensor images tissue whereas the other side does not. By selecting the window on the side of the field where the tissue is, a good error signal may still be obtained. Alternatively, one or more line sensors can be combined thus providing one or more measurements of the autofocus signal.

To detect the amount of defocus, image analysis algorithms may be used that quantify the amount of sharp detail in the image on the autofocus sensor. A two stage algorithm may be used: a first stage algorithm detects the amount of contrast at a given time on the image produced by the autofocus sensor. Subsequently a second stage algorithm compares the results of the first stage algorithm from two sequential images (not necessarily adjacent frames, a frame can be compared to a frame several frames back) taken by the autofocus sensor while the object under the microscope is being translated.

The first stage, low level algorithm produces a curve which indicates the amount of detail in the image on the autofocus sensor, as a function of the x position on that sensor. Because the autofocus sensor is tilted with respect to the x direction, i.e. with respect to the front surface of the tissue slide assembly, the depth in the object at which the autofocus sensor image is generated varies with the x position on the sensor as well. Therefore, the contrast curves generated by the first stage algorithm, are a function of the x-position on the sample, as well as the depth (z position) of the sample. This is shown in FIG. 4A to 4D. Many methods for generating such detail dependent curves may be used, wherein the ones shown here are based on sobel edge detection. This invention is not specific to the method of detail detection used in the first stage algorithm, it should work for any known method.

Figure 4A:
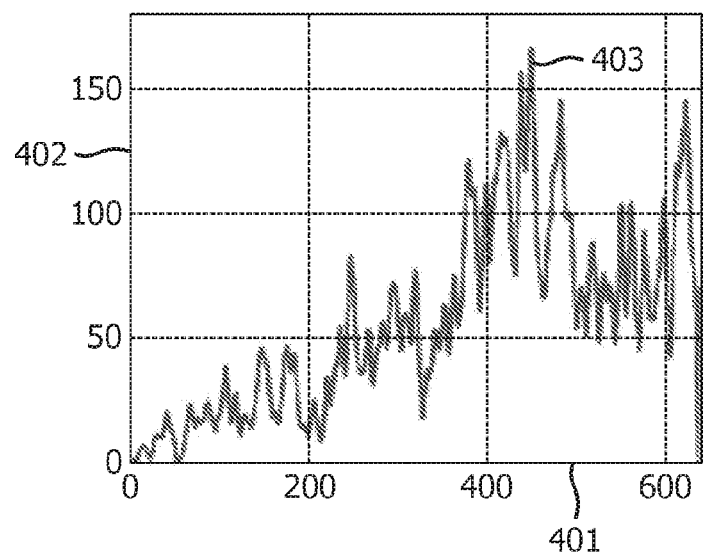
FIGS. 4A and 4B show two sequential images generated by the autofocus sensor.
Figure 4B:
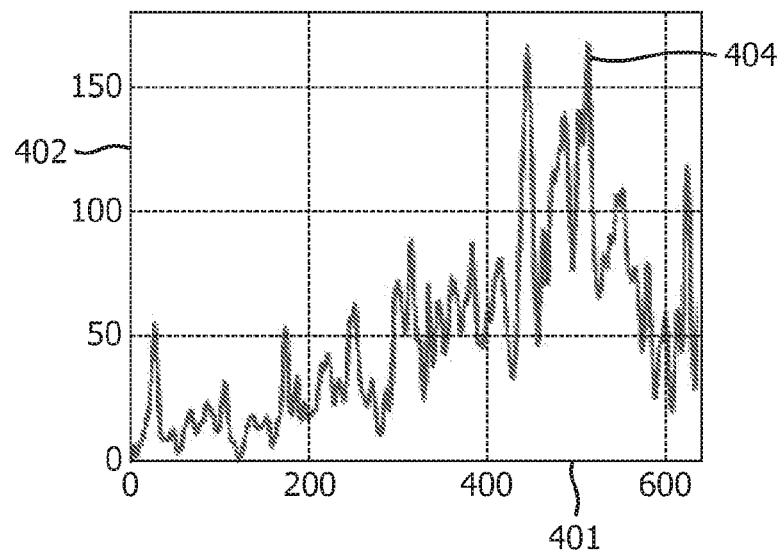

FIGS. 4A and 4B show sequential images generated by the autofocus sensor during a scan (i.e. a translation of the sample along the x direction 6, see FIG. 2). The horizontal axis 401 in FIGS. 4A and 4B depicts the x-position on the image and the vertical axis 402 depicts a signal value, for example a contrast.

The curves 403, 404 are the outcome of the low level algorithm, one for each image. The image corresponding to curve 404 is translated approximately 60 pixels with respect to the image corresponding to curve 403. The curves 403, 404 clearly show that the outcome of the low level algorithm is dependent both on the x position of the object with respect to the autofocus sensor (the high frequency detail, which is qualitatively the same, but translated, in the left image compared to the right image), as well as the z position of the object with respect to the autofocus sensor (the low frequency envelope, more or less gaussian, peaking around 450).

Figure 4C:
FIGS. 4C and 4D show corresponding contrast curves generated by the calculation unit.
Figure 4D:
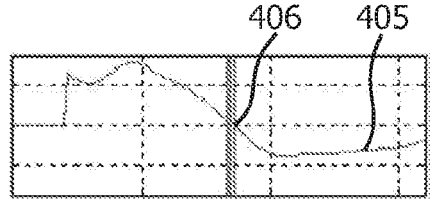

The second stage, high level algorithm, subtracts two sequential results from the first stage algorithm (from now on called focus curves) from each other, after correcting for the translation of the sample. This is shown in FIGS. 4C and 4D. Subtracting two sequential focus curves, as generated by the first stage algorithm and shown in FIG. 4C, gives a so called S-Curve 405 shown in FIG. 4D. The zero crossing 406 of the S-Curve (at the position of the vertical line) is the in-focus position of the sample.

Clearly, the high frequency detail that was present on the focus curves, and which was a result of the information content of the image, is no longer present in the S-Curve. The S-Curve is a stable signal which is not dependent on the (local) morphology of the object that is being imaged in the microscope. An S-Curve may be generated for each frame generated by the autofocus image sensor, and the zero crossing of the most recent S-Curve indicates the ideal focus position at a time T exactly in between the acquisition of the two frames that were compared.

In other words, this two stage approach clearly suppresses the high frequency noise present on the focus curves. Thus, a high bandwidth polar focus error detection during the scanning action of the microscope may be provided.

The maximum bandwidth of the autofocus signal is determined by the frame rate of the sensor. Off the shelve sensors are readily available offering 200 Hz frame rates. For a typical fast scanning microscope, at 10 mm/s, this implies a focus measurement every 50 micrometers.

An embodiment which allows for real-time determination of the z-position at which the tissue is in focus, is the combination of a high-speed image sensor with an FPGA processor, or a dedicated image processing ASIC.

Once the optimum focus position $z_{opt}$ has been determined, either a feed-back, or a feed-forward focus strategy can be implemented. In the feed-back case, the detection of the focus position $z_{opt}$ would ideally take place at exactly the same position and time as where the imaging is done. Based on the error signal (the desired focus position $z_{opt}$ minus the actual focus position of the imaging objective lens $z_{obj}$) the focus position $z_{obj}$ of the imaging optics is adjusted. The sample rate with which the focus position $z_{opt}$ is obtained will determine the ultimate bandwidth of such a feedback system. Typically a bandwidth that is a factor of 10 lower than the sampling rate may be obtained.

The tilted cross-section of the slide that is imaged onto the autofocus sensor intersects the focal plane of the objective in a line. Possibly, in all of the above embodiments this line is offset from the line imaged by the (TDI or non-TDI) line sensor in the positive scan direction ("upstream") by a distance Δx, such that Δx/v, where v is the scan velocity, is larger than the time needed for computing the focus error signal from the autofocus image. This is advantageously used in the feed-forward scenario, where the detection of the focus position $z_{opt}$ would ideally take place ahead (in time) of the imaging. In addition, the offset Δx should be small enough such that the autofocus image fits within the field of view of the objective. A feed-forward system can be infinitely fast, however, the maximum scan speed is limited by the fact that the determination of the focus position has to be performed within the amount of time that elapses between the time when the focus position measurement for a certain region of the sample is performed, and the time when that same region is imaged. Another limiting factor is the speed with which the imaging optics' focus position can be adjusted.

Figure 5:
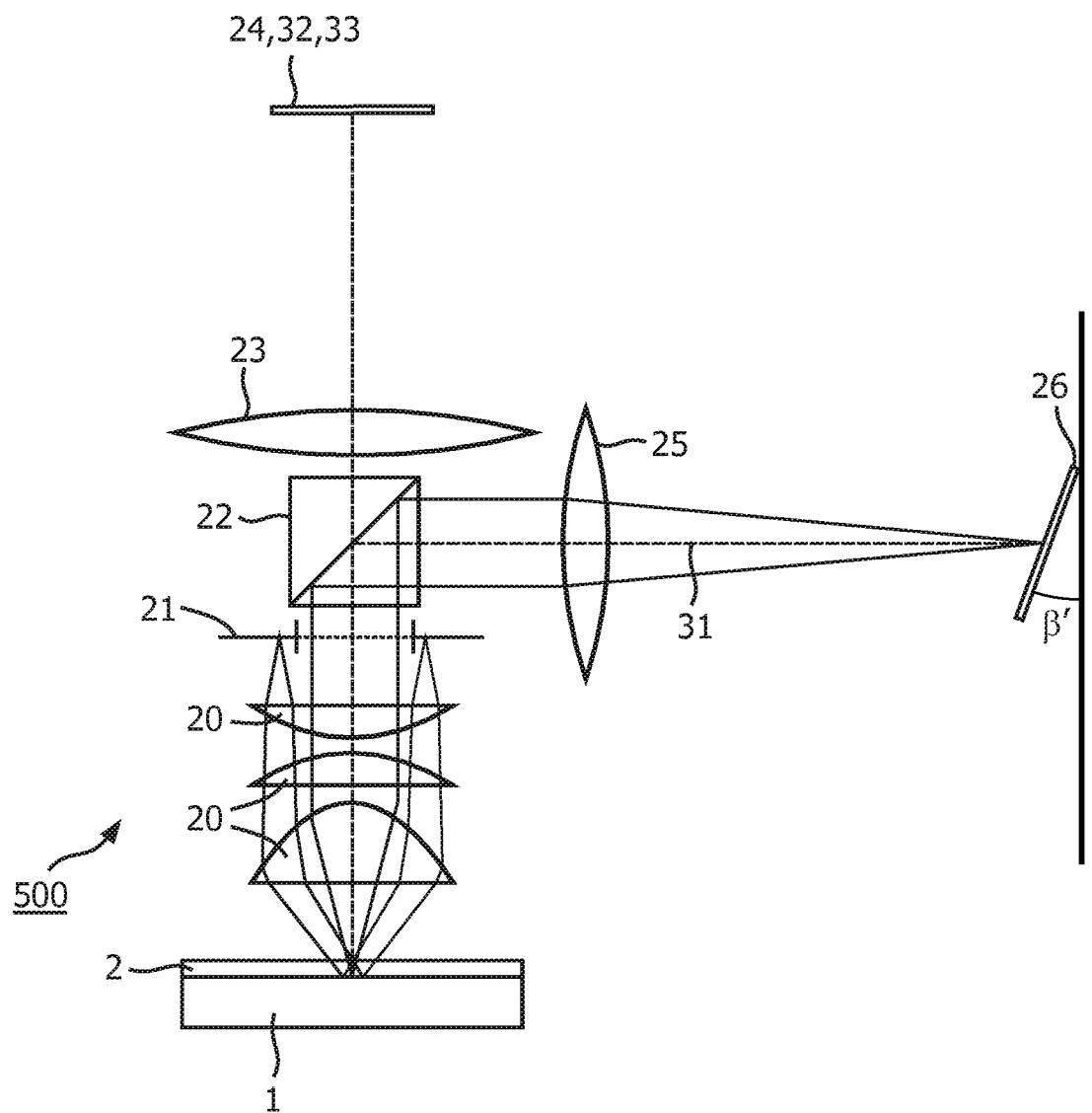
FIG. 5 shows a microscope with an autofocus imaging system according to an exemplary embodiment of the invention.

As a non limitative example, FIG. 5 shows part of a microscope system and in particular the imaging branch of the light path. An embodiment for epi-mode dark field illumination is shown in FIG. 6.

The light passing through the slide 1 and the cover slip 2 (and tissue layer 4, not shown) is captured by the objective lens 20 with the back aperture 21, wherein the unscattered beams are blocked. A colour splitter 22 splits off the white light which is imaged by a tube lens 23 onto the image sensor arrangement, which may comprise a first, a second and a third primary image sensor 24, 32, 33, which may be adapted in the form of line sensors, for generating the digital tissue image. The infrared light is imaged by a second tube lens 25 onto the autofocus image sensor 26, which is tilted with respect to the optical axis 31 of radiation from the object of interest towards the autofocus image sensor 26. In the context of this disclosure "tilted with respect to the optical axis of the primary image sensor" means that the radiation from the object of interest which impinges on the autofocus image sensor does not impinge on the autofocus image sensor perpendicularly. However, the radiation which travels from the object of interest towards the primary image sensor may impinge perpendicularly on the primary image sensor, although this is not required. Rays scattered by the tissue can pass through the aperture 21 and are imaged onto the autofocus image sensor 26.

Figure 6:
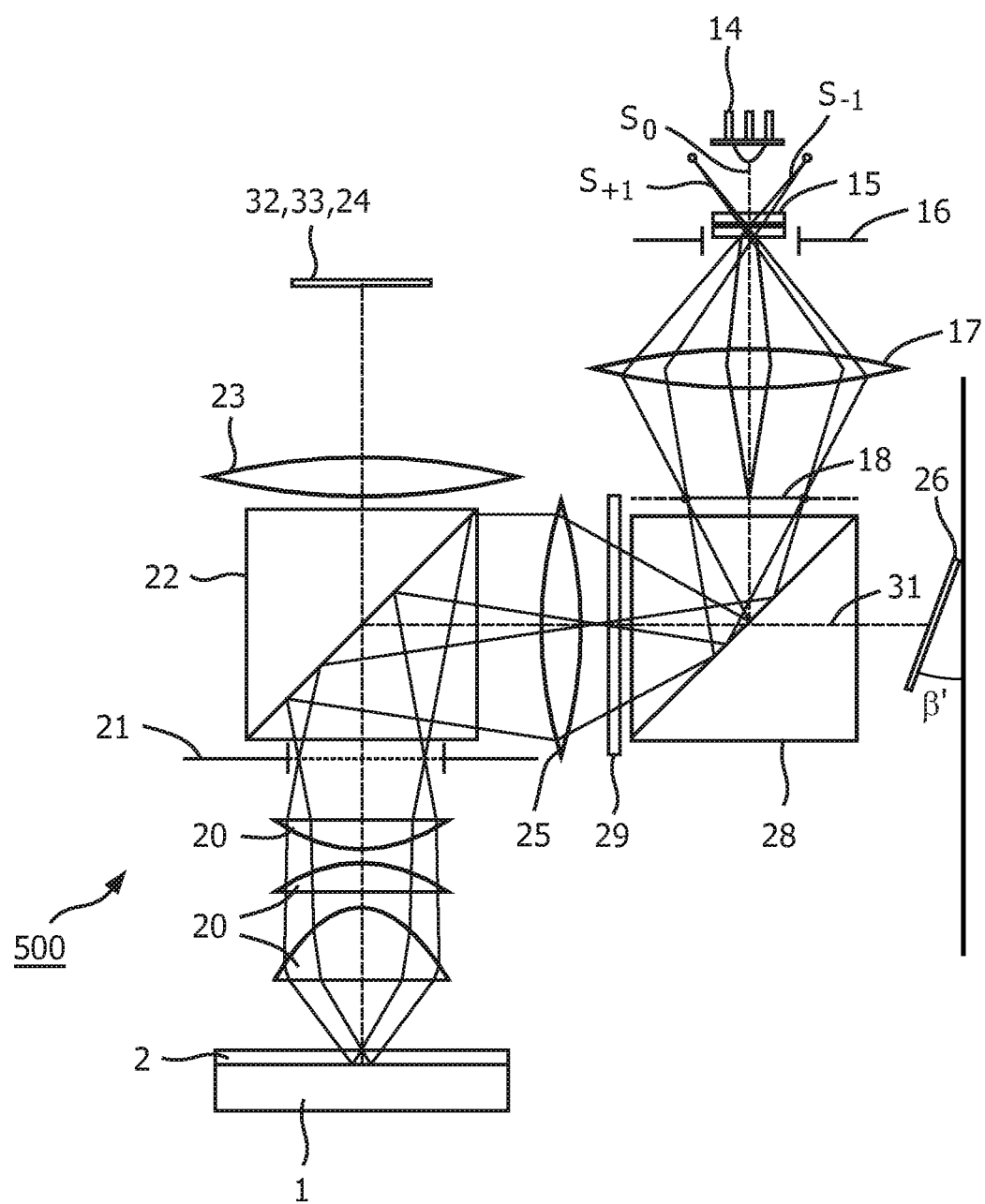
FIG. 6 shows a microscope with an autofocus imaging system according to another exemplary embodiment of the invention.

FIG. 6 shows an optical layout for epi-mode dark field illumination of a microscope system with an autofocus imaging system 500 having a laser diode 14, the illumination being integrated with the imaging branch. Two crossed gratings 15 are arranged after the laser diode 14 for generating diffraction orders, for example a 0th diffraction order $S'_0$, a +1$^{st}$ order $S'_{+1}$ and a −1$^{st}$ order $S'_{-1}$. Still further, a field stop 16 is arranged close to the gratings 15 for limiting the width of the dark field illumination beams, and a collimator lens 17 the collimates the light from the laser diode 14.

A polarizing beam splitter 28 is provided to split the beam after it has passed the collimator lens 17. Furthermore, the microscope comprises quarter-wave plate 29. Both elements 28 and 29 take care of directing the beam originating from the laser towards the objective lens and erecting the scattered light originating from the tissue towards the autofocus image sensor.

Figure 7:
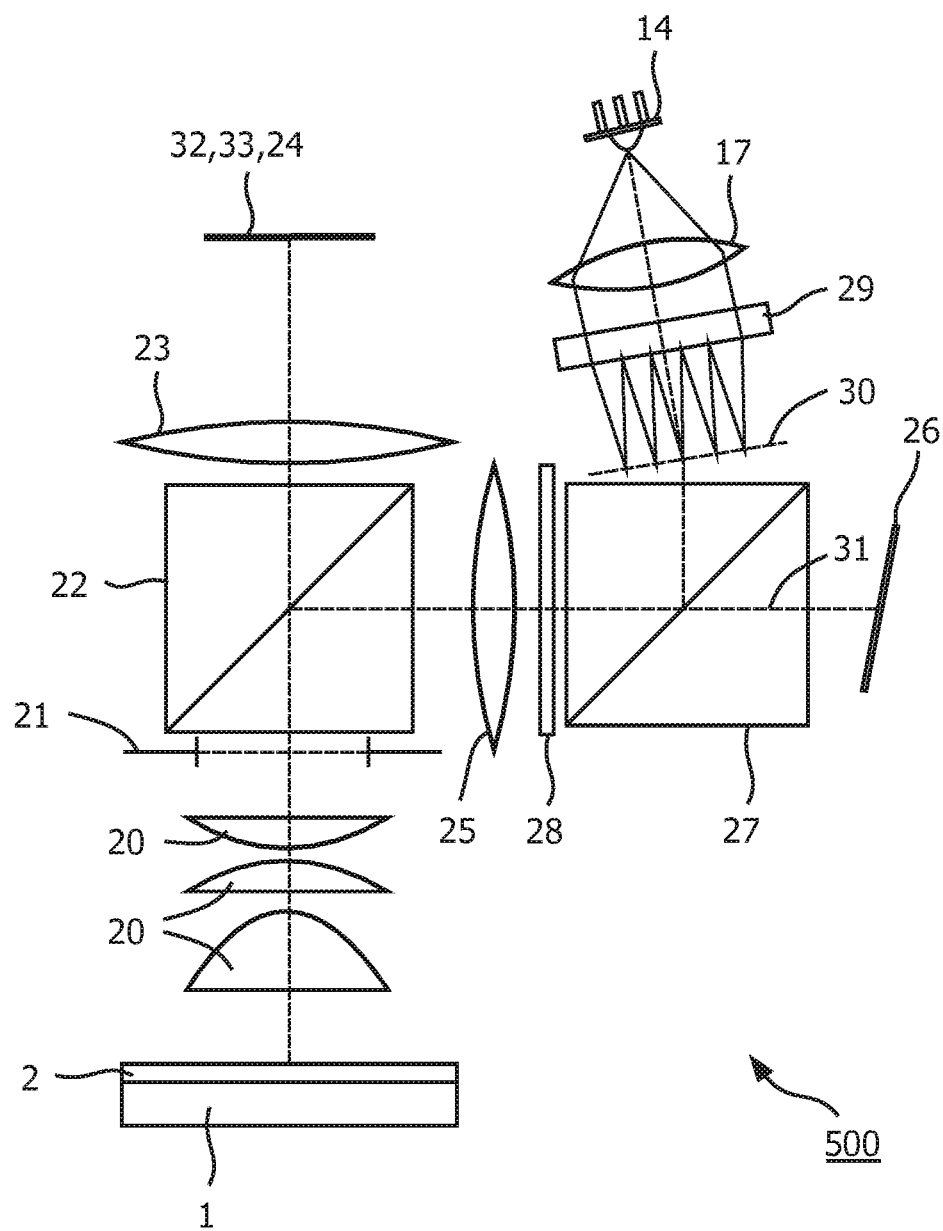
FIG. 7 shows a microscope with an autofocus imaging system according to another exemplary embodiment of the invention.

FIG. 7 shows an optical layout for multi-spot illumination of a microscope 500, which illumination is integrated with the imaging branch. The lens 17 collimates the beam which is incident on a spot generator for generating an array of spots 30. By tilting the whole assembly, the spot array can be tilted so that the resulting incident spot array and the slide is tilted as well. The spot generator 29 generates an array of low-NA beams, which can pass the beam splitter 27 without introducing significant aberrations.

In the embodiment of FIG. 7 an array of spots is used to illuminate the oblique section 5 that is imaged by the autofocus image sensor. The spots that are focused on the tissue may experience time-dependent scattering as the absorption and refractive index of the region into which the spot is focused changes with scanning By examining the time-dependence of the spots imaged on the autofocus image sensor the axial position of a tissue layer may be located. Namely, close to focus the high resolution information is visible, away from focus this is blurred. As a consequence, the signal variations on a comparatively small time scale may be maximum when the tissue layer coincides with the focal plane.

Figure 8:
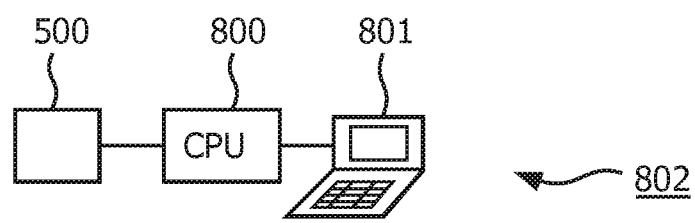
FIG. 8 shows a microscope system according to an exemplary embodiment of the invention.

FIG. 8 shows a microscope system 802 comprising a microscope with an autofocus imaging system 500 connected to a processor or processing unit 800 which is connected to a user interface 801, such as a computer.

Figure 9:
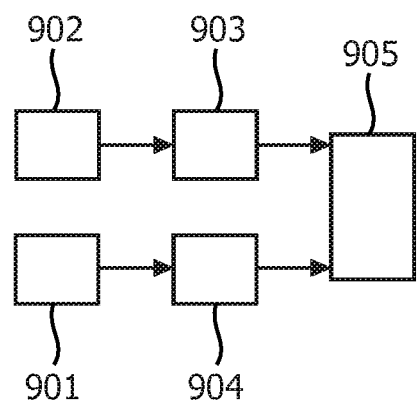
FIG. 9 shows a flow-chart of a method according to an exemplary embodiment of the invention.

FIG. 9 shows a flow-chart of a method according to an exemplary embodiment In step 901 primary image data of an object of interest is acquired by a primary image sensor arrangement. At the same time or before, in step 902, first autofocus image data is acquired by a tilted autofocus image sensor. Later, after translation of the object of interest, in step 903, second autofocus image data of an oblique section of the object of interest is acquired by the tilted autofocus image sensor (at which time also another primary image data can be acquired by the primary image sensor (step 904)). Then, in step 905, a polar error signal of a focus position of the microscope is generated on the basis of a comparison of the first autofocus image data with the second autofocus image data.

The described autofocus system finds application in digital pathology and other fields of rapid micro scanning While all embodiments so far reference two separate image sensors, i.e. the primary image sensor, and the autofocus image sensor it should be noted that, as mentioned before, in an additional embodiment these two sensors can be replaced by one image sensor which provides the same functionalities as the two separate sensors. This combined sensor may be adapted as a 2D image sensor of some fashion and has to be tilted with respect to the optical axis. As may be understood from European patent application No 09306350, all or a subset of the pixels of the combined sensor are used to generate the autofocus image data, while another potentially overlapping set is used to generate the primary image data. These two sets of pixels can be different physical pixels captured simultaneously, or partially the same pixels captured sequentially, or a combination of both. As non limiting example of an implementation of this embodiment, one may use a 2D image sensor, where all pixels are used to generate the autofocus image data, and a single row of pixels, perpendicular to the scan direction, is used to form a virtual line sensor, which is used to generate the primary image data.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practising the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

List of Reference Signs 1 microscope slide
2 cover slip
3 mounting medium
4 tissue layer
5 oblique cross-section
6 scanning direction
7 axial direction
14 laser diode
15 two crossed gratings
16 field stop
17 collimator lens
18 stop for blocking Oth order light rays
20 objective lenses
21 back aperture
22 colour splitter
23 tube lens
24 first primary image sensor
25 tube lens
26 autofocus image sensor
28 beam splitter
29 quarter-wave plate
31 optical axis
32 second primary image sensor
33 third primary image sensor
301 autofocus sensor tilt angle
302 z-range
303 curve
401 x-position on the image
402 signal value
403 outcome of the low level algorithm
404 outcome of the low level algorithm
405 S-curve
406 zero crossing
500 autofocus imaging system
800 processor
801 user interface
802 microscope system
901 method step
902 method step
903 method step
904 method step

The invention claimed is:

1. An autofocus imaging system for a microscope system, the autofocus imaging system comprising:
an image sensor arrangement configured to acquire a primary image data of an object of interest and first and second autofocus image data of an oblique section of the object of interest, wherein the image sensor arrangement comprises a tilted autofocus image sensor configured to acquire the first autofocus image data and, at a later time, the second autofocus image data; and
a calculation unit configured to generate a polar error signal of a focus position of the microscope system based on a comparison of a first data relating to the first autofocus image data with a second data relating to the second autofocus image data,
wherein the comparison comprises:
determining a first contrast function in the first autofocus image data, the first contrast function being a first contrast as a function of a first position on the tilted autofocus image sensor;
determining a second contrast function in the second autofocus image data, the second contrast function being a second contrast as a function of a second position on the tilted autofocus image sensor; and
comparing the first contrast function with the second contrast function, and
wherein, for the comparing the first contrast function with the second contrast function, the calculation unit is further configured to correct the second contrast function for translation of the object of interest and then for subtracting the first and second contrast functions, or filtered or transformed versions of the first and second contrast unctions, from each other, resulting in an S-curve.

2. The autofocus imaging system of claim 1, wherein the image sensor arrangement further comprises a primary image sensor configured to acquire the primary image data of the object of interest.

3. The autofocus imaging system of claim 2,
wherein the primary image sensor is a line sensor; and
wherein the tilted autofocus image sensor is a two-dimensional sensor.

4. The autofocus imaging system of claim 1, wherein the second autofocus image data is configured to be acquired after the object of interest has been translated from a first position to a second position, wherein the first autofocus image data has been acquired at the first position.

5. The autofocus imaging system of claim 1, wherein, for the generating of the polar error signal, the calculation unit is further configured to determine a zero crossing of the S-curve.

6. The autofocus imaging system of claim 1, wherein the autofocus imaging system is configured to perform a feedback or feed-forward control of the focus position after a determination of an optimal focus position.

7. The autofocus imaging system of claim 1, wherein the tilted autofocus image sensor is tilted with respect to an optical axis of a lens focusing radiation being radiated from the object of interest on the tilted autofocus image sensor.

8. The autofocus imaging system of claim 7, wherein a primary image sensor and the tilted autofocus image sensor are provided by a single physical image sensor, the single physica image sensor being thted with respect to the optical axis.

9. The microscope system comprising the autofocus imaging system of claim 1.

10. A method for autofocus imaging of a microscope system, the method comprising acts of:
acquiring a primary image data of an object of interest by an image sensor arrangement;
acquiring a first autofocus image data and, at a later time, a second autofocus image data of an oblique section of the object of interest by a tilted autofocus image sensor of the image sensor arrangement; and
generating a polar error signal of a focus position of the microscope system based on a comparison of a first data relating to the first autofocus image data with a second data relating to the second autofocus image data,
wherein the comparison comprises acts of:
determining a first contrast function in the first data, the first contrast function being a first contrast as a function of a first position on the autofocus image sensor;
determining a second contrast function in the second data, the second contrast function being a second contrast as a function of a second position on the autofocus image sensor; and
comparing the first contrast function with the second contrast function, and
wherein the act of comparing the first contrast function with the second contrast function comprises acts of:
determining an S-curve, by subtracting the first and second contrast functions, or filtered or transformed versions of the first and second contrast functions, from each other; and
generating the polar error signal by determining a zero crossing of the S-curve.

11. A non-transitory computer readable medium comprising computer instructions which, when executed by a processor of a microscope system, configure the processor to perform a method of autofocus imaging of the microscope system, the method comprising acts of:
acquiring a primary image data of an object of interest by a primary image sensor arrangement;
acquiring a first autofocus image data and, at a later time, a second autofocus image data of an oblique section of the object of interest by a tilted autofocus image sensor of the image sensor arrangement; and
generating a polar error signal of a focus position of the microscope system based on a comparison of a first data relating to the first autofocus image data with a second data relating to the second autofocus image data,
wherein the com.arison comprises:
determining a first contrast function in the first data, the first contrast function being a first contrast as a function of a first position on the autofocus image sensor;
determining a second contrast function in the second data, the second contrast function being a second contrast as a function of a second position on the autofocus image sensor; and
comparing the first contrast function with the second contrast function, and
wherein the comparing the first contrast function with the second contrast function comprises:
determining an S-curve, by subtracting the first and second contrast functions, or filtered or transformed versions of the first and second contrast functions, from each other.

* * * * *